United States Patent Office 2,914,293
Patented Nov. 24, 1959

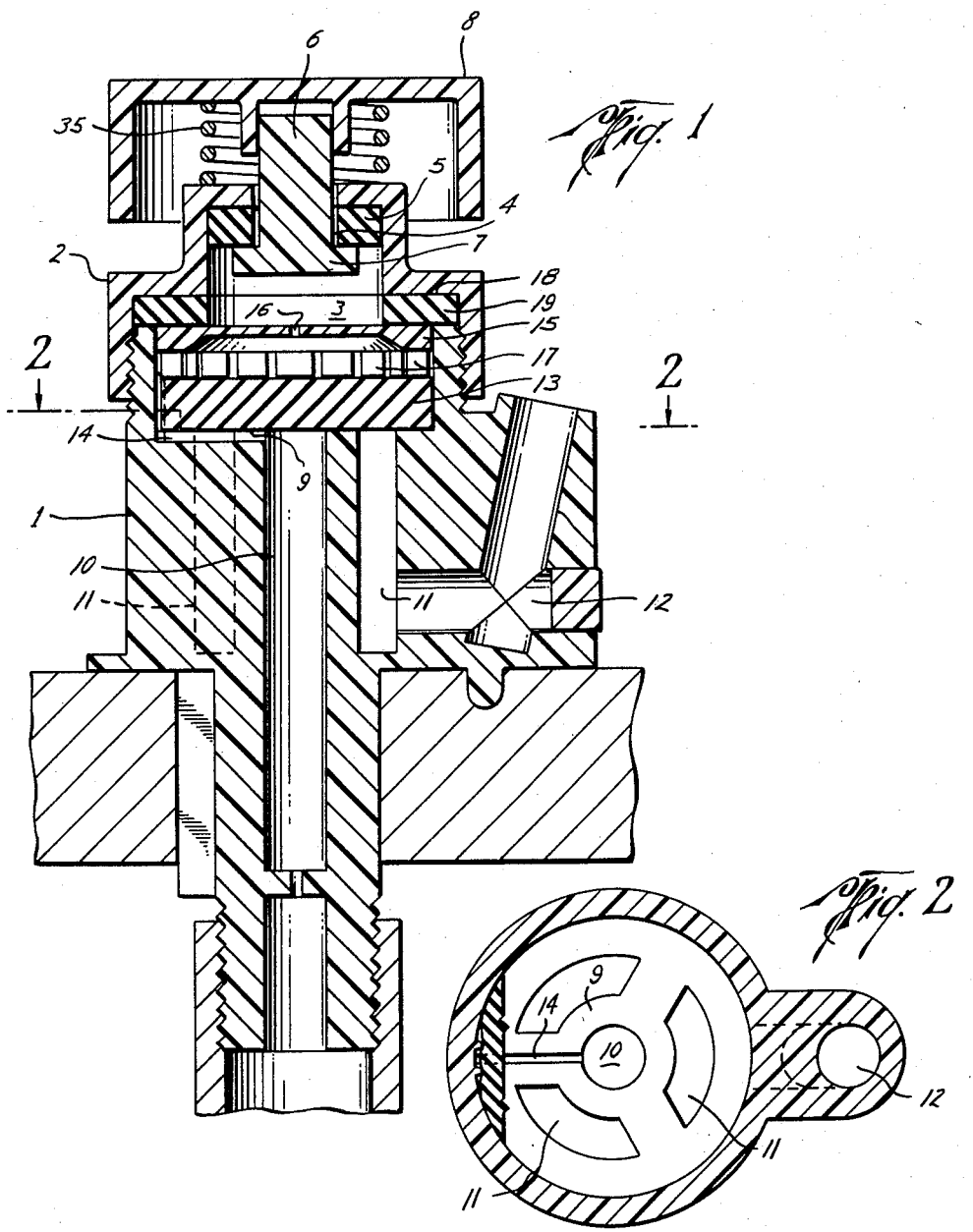

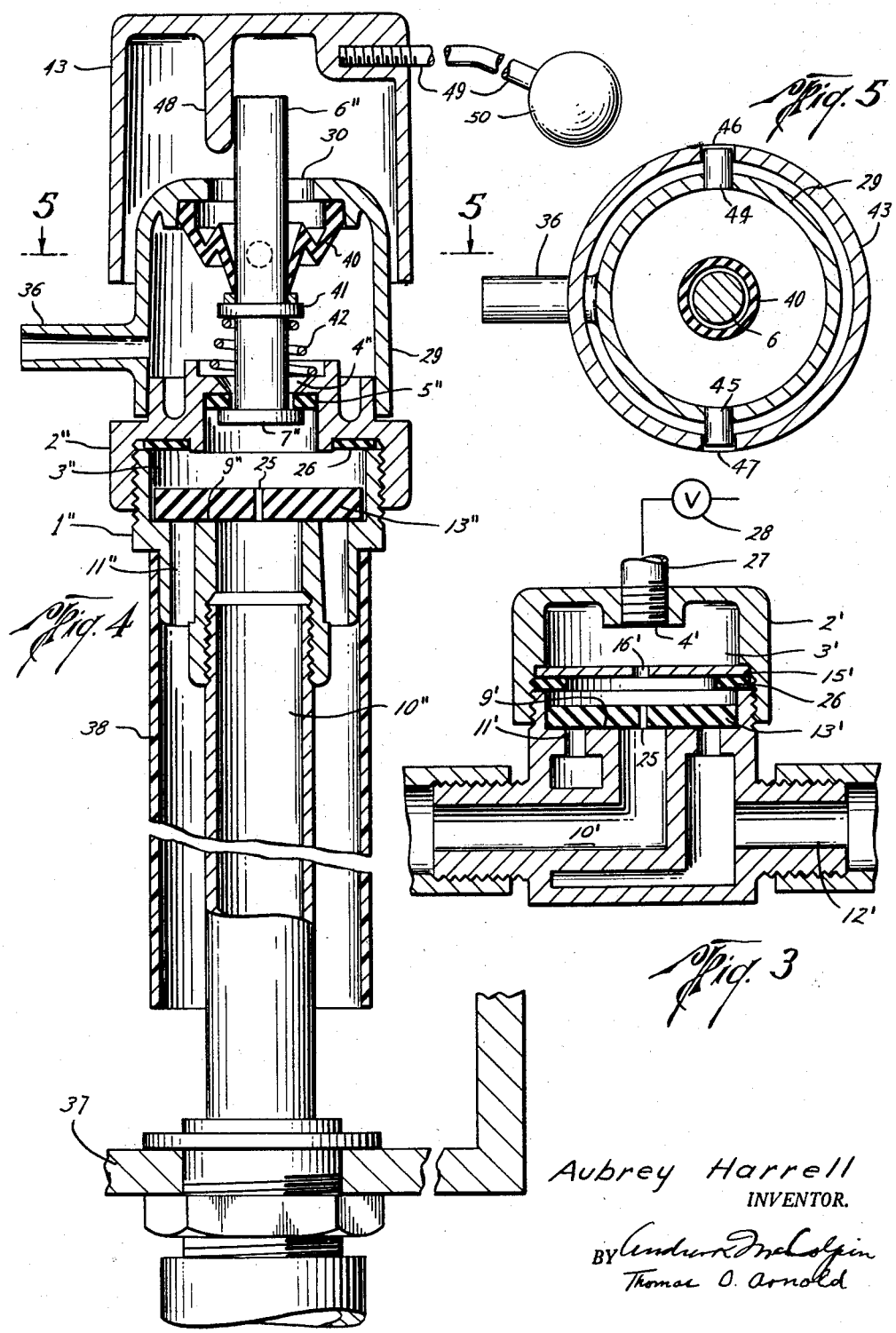

2,914,293

PILOT CONTROLLED FLUSH VALVES

Aubrey Harrell, Austin, Tex.

Application November 21, 1956, Serial No. 623,575

9 Claims. (Cl. 251—36)

This invention relates to valves and more particularly to pressure actuated fluid valves.

Heretofore there has been a wide variety of pressure actuated fluid valves, ordinarily constructed of brass and usually of the float controlled type particularly adapted to operate in connection with a flushing apparatus. While these valves were improvements over their predecessors, nearly all had certain disadvantages. For example, they are not easily adapted to other than float controlled operations. Further, they usually have a number of moving parts and are thus relatively expensive to fabricate and assemble. Being constructed of brass they are susceptible to corrosive action by alkalies and acids as well as electrolytic action. The prior valves have often been noisy due to vibration or water hammer.

It is an object of this invention to provide a pressure actuated fluid valve which is adaptable for use in a variety of installations.

Another object of this invention is to provide a pressure operated fluid valve which is inexpensive to manufacture, simple to assemble and subject to virtually no wear.

A further object of this invention is to provide such a valve that is quiet in operation.

Still another object of this invention is to provide such a valve that is substantially impervious to corrosive action by acids and alkalies, electrolytic action and scale deposits.

Yet another object of this invention is to provide such a valve that is operable from a remote point.

A still further object of this invention is to provide such a valve which is a slow opening valve.

Other objects and advantages of the invention are apparent from the accompanying drawings and the following description.

In accordance with this invention these objects are accomplished by providing a closed casing having a vent hole therein. Within the casing is a valve which opens and closes in response to a differential in forces acting upon the opposite sides thereof. Above the valve is a diaphragm with a bleed hole therethrough. The bleed hole is smaller than the vent hole in the casing. Means are provided which allow fluid passage from one side of the valve to the other, such means being smaller than the bleed hole of the diaphragm. Communicating with the casing on the side of the valve farthest from the vent hole is a fluid inlet conduit and at least one fluid outlet conduit. Means are provided for opening and closing the vent hole.

The invention will be clearly understood by referring to the accompanying drawings and following description wherein:

Fig. 1 is a vertical sectional view of a preferred embodiment of the invention;

Fig. 2 is a cross sectional view of Fig. 1 taken on line 2—2;

Fig. 3 is a vertical sectional view of another preferred embodiment of the invention;

Fig. 4 is a vertical sectional view of yet another preferred embodiment of the invention; and Fig. 5 is a cross-sectional view of Fig. 4 taken on line 5—5.

Fig. 1 illustrates a typical application of the invention as a water fountain valve. A casing 1 fitted with a cap 2 defines a pressure chamber 3. The cap 2 has a vent 4 therein. Within the chamber 3 a seat washer 5 is fitted about the vent 4. A stem 6, extending through the vent 4, has an annular shoulder 7 at its lower end which is within the pressure chamber 3. The upper end of the stem 6 is fitted with a touch button 8. Resilient means are provided which normally urge the stem 6 upward, thereby causing the shoulder 7 to seat against the washer 5, effectively closing the vent 4. Advantageously this may be a spring 35 about the seem 6 which is held in place by the outside surface of the cap 2 and the under surface of the touch button 8.

The stem 6 is of such diameter in relation to the diameter of the vent 4 that fluid may be discharged through the vent 4 when the shoulder 7 is unseated from the washer 5.

Within the chamber 3 is a valve seat 9. A fluid inlet conduit 10 communicates with the chamber 3 through the seat 9. Spaced about the inlet conduit 10 are a plurality of outlet conduits 11. A delivery tube 12 communicates with the outlet conduits 11 and allows fluid to flow from the valve to a point remote therefrom. It will be understood that the number and size of the outlet conduits 11 may be varied as so desired. It will also be understood that the size of the inlet conduit 10 may be varied to accomodate pressure variations.

Within the chamber 3 is a valve closure disc 13, preferably of a flexible and resilient material such as rubber. The closure disc 13 is of such diameter that the edge thereof makes contact with the walls of the chamber 3. Means are provided that allow fluid passage from the inlet conduit 10 to the chamber 3 above the disc 13. Conveniently this may take the form of a channel 14 from the inlet conduit 10 across the piston seat 9 and up the wall of the chamber 3 a distance above the disc 13. Alternatively there may be a small aperture through the disc 13.

Above the closure disc 13 is an orifice plate or diaphragm 15 conveniently of a non-resilient material with a bleed hole 16 therethrough. A plurality of depending teeth 17 are spaced about the periphery of the orifice plate 15 to space it from the closure disc without cutting off flow of fluids from the channel 14 to the chamber 3. The diaphragm 15 is fitted in the chamber 3 above the disc 13 in such a manner that the shoulder 7 of the stem 6 does not contact the diaphragm 15 even when the touch button 8 is depressed to the limit. The teeth 17 of the orifice disc or diaphragm 15 contact the periphery of the disc 13 and hold the closure disc 13 in place on the valve seat 9. The diaphragm 15 is held firmly in place by the shoulder 18 of the cap 2 which is fitted with a gasket 19 to maintain a seal in the chamber 3 above the diaphragm 15. It will be noted that the valve closure disc 13 is thereby prevented from reciprocating in the chamber 3. However, as the closure disc 13 is of a flexible and resilient material, it may bulge upwards in the center thereby uncovering the fluid inlet conduit 10 and the outlet conduits 11. Alternatively, the diaphragm 15 may be spaced apart from the closure disc 13 and the closure disc 13 allowed to actually reciprocate.

An alternative embodiment of the invention is shown in Fig. 3. There the valve is adapted to be operated from a remote point.

The casing 1' is shown with the cap 2' defining a pressure chamber 3'. A fluid inlet conduit 10' communicates with the chamber 3' through the valve seat 9'. Spaced about the inlet conduit 10' are a plurality of outlet conduits 11'. A delivery tube 12' communicates with the outlet conduits 11' and allows fluid to flow from the valve to a point remote therefrom.

Within the chamber 3' is an axially slidable valve closure disc 13', the edge of which makes contact with the wall of the chamber 3'. Means are also provided to allow fluid passage from the inlet conduit 10' to the chamber 3' above the valve disc 13'. While a channel as shown in Fig. 1 could be employed, such means are shown in this embodiment as an aperture 25 through the disc 13'.

Above the disc 13' is a diaphragm 15' with a bleed hole 16' therethrough. Conveniently the orifice disc or diaphraghm 15' is spaced apart from the valve disc 13'. Just below the orifice disc 15' an annular ring gasket 26 is placed. The ring gasket 26 and the diaphragm 15' are held in place by the cooperation of the cap 2' and the terminal end of the casing 1'. The ring gasket 26 limits the upward stroke of the valve disc 13'.

Outside the cap 2' and over the vent 4' is fitted a vent conduit 27. There is provided in the vent conduit 27 at a point remote from the valve means for opening and closing the vent conduit 27. Conveniently this may take the form of a gate valve 28.

Illustrated in Fig. 4 is still another embodiment of the invention particularly adapted to be used in connection with flushing devices. Again a casing 1" is fitted with a cap 2" defining a pressure chamber 3". A vent 4" is provided within the cap 2". Within the chamber 3" a seat washer 5" is fitted about the vent 4". A vent housing 29 surrounds the vent 4" above the cap 2" having an opening 30 in the top. A stem 6", extending through the opening 30, the vent housing 29 and the vent 4", has an annular shoulder 7" at its lower end within the chamber 3". A spring retaining flange 41 is fitted about the stem 6". Resilient means are provided which normally urge the shoulder 7" against the seat washer 5" thereby maintaining an effective seal. Conveniently this may be a spring 42 which is positioned about the stem 6" between the cap 2" and the spring retaining flange 41. The stem 6" is of such diameter in relation to the diameter of the vent 4" that fluid may be easily discharged through the vent 4" when the shoulder 7" is unseated from the washer 5".

Within the vent housing 29 sealing means are provided about the stem 6", thereby preventing the escape of fluid through the opening 30 in the vent housing 29. Conveniently this may take the form of a grommet seal 40. A supply tube 36 extends from the vent housing 29 and is ordinarily connected to the overflow conduit (not shown) of the flush tank 37. It will be noted that the supply tube 36 opens into the vent housing 29 between the sealing means and the vent 4", so that fluid flowing through the vent 4" may flow out through the supply tube 36 and not through the opening 30 in the vent housing 29.

A bonnet 43 is hingedly mounted on the vent housing 29. Conveniently this may be accomplished through the employment of a nipple and slot arrangement. Two nipples 44 and 45 oppositely disposed on the vent housing 29 engage corresponding slots 46 and 47 in the bonnet 43. Extending from the underside of the bonnet 43 is a stem bar 48 which is positioned in such relation with the stem 6" that it will engage and tilt the stem 6" when the bonnet 43 is rotated on the nipples 44 and 45. Extending from the outside of the bonnet 43 and oppositely disposed from the stem bar 48 is a rod 49 which has an activator ball 50 at its terminus. The activator ball 50 is not the common hollow metal float, but is advantageously a solid plastic ball heavy enough that will cause the bonnet 43 to rotate when the flush tank 37 is emptied, yet light enough to be buoyed upward as the flush tank 37 fills.

A fluid inlet conduit 10" and fluid outlet conduits 11" communicate with the chamber 3" through the valve seat 9". A valve closure disc 13" is employed substantially as described with respect to the embodiment shown in Fig. 3. Although not shown, a diaphragm arrangement as illustrated in Fig. 3 may be employed in substantially the same manner.

Advantageously, there is a splash tube 38 depending from the casing 1". The splash tube 38 extends to the bottom of the flush tank 37 and provides for the silent flow of fluid from the outlet conduits 11" into the flush tank.

The valves embodying this invention are advantageously molded in one piece from nylon. There are many advantages to the use of nylon in the construction of such valves. It is much easier and cheaper to fabricate a valve from nylon by molding than by casting and machining a valve from metal such as brass. Further the cost of nylon is low as compared with brass and there is no waste of material since the scrap nylon may easily be used again. Nylon also has a higher tensile strength than brass. Even more important is the fact that nylon resists the corrosive action of most acids and alkalies, eliminates electrolytic action and provides comparative freedom from scale deposits.

Basically, the operation of all three embodiments of the invention illustrated is the same. As long as the vent 4 is open, pressure of the fluid in the fluid inlet conduit 10 unseats the valve closure 13 sufficiently to permit fluid flow from the fluid inlet conduit 10 into the chamber 3 and thence through the outlet conduits 11.

When it is desired that fluid flow cease the vent 4 is closed. Fluid continues to flow through the valve momentarily. Some of the fluid, however, flows above the closure disc 13 either through the channel 14 or the aperture 25 until pressure above and below the closure disc in the now closed chamber 3 is equalized. As the space above the valve closure disc 13 becomes filled with fluid, the valve closure disc 13 is forced downward, seating on the valve seat 9 and thereby covering the fluid inlet conduit 10 and the outlet conduits 11. It will be understood that the valve closure disc 13 is forced downward and seated because the area of the valve closure disc 13 being subjected to pressure from above is greater than the area being subjected to pressure from below.

The orifice disc 15 employed in this invention serves a substantial purpose and the bleed hole 16 thereof must have a certain size relative to the vent 4 and the fluid passage means (the channel 14 or the aperture 25). The bleed hole 16 must be smaller than the vent 4 and larger than the channel 14 or aperture 25. That is, the bleed hole 16 must be of such a size that fluid will flow therethrough slower than fluid flows out the vent 4 when the vent 4 is opened by the action of either the touch button 8 or the gate valve 28 or the rod 49. The bleed hole 16, while being smaller than the vent 4, must be of such size that fluid may flow therethrough faster than fluid flows through the channel 14 or the aperture 25.

It will be understood that such construction causes the closure disc 13 to slowly unseat and seat when the vent 4 is opened and closed. This is, of course, desirable as objectionable water hammer is thereby prevented. Additionally, in water fountain valves it is particularly desirable to regulate the speed of opening of the valve so that the water does not flow at full force when the valve control is slightly moved. The slow upward movement allows a gradual increase in the amount of water delivered and thereby prevents water from spurting quickly out into the drinker's face.

Referring specifically to the valve shown in Fig. 1, the vent 4 is opened by pressure on the touch button 8. Advantageously the stem 6 is so proportioned in relation to the vent 4 that the shoulder 7 may be unseated from the washer 5 by tilting the touch button 8 rather than depressing it. It will be appreciated that it is much easier to tilt the touch button 8 than to depress it against the pressure exerted by the fluid in the pressure chamber 3, especially in the case of water fountain valves where the water usually is at a pressure of 30 to 100 pounds per square inch.

When the vent 4 is opened by tilting the touch button 8, fluid is allowed to flow out of the chamber 3, thereby releasing the fluid pressure above the piston 13. However, as only a small quantity of fluid can escape from below the diaphragm 15 through the bleed hole 16 and out the vent 4, the pressure is not immediately relieved above the valve closure disc 13 and consequently the valve closure disc 13 bulges upward slowly.

When the touch button 8 is released, fluid continues to flow from the inlet conduit 10 through the channel 14 above the valve closure 13 until the total force of the fluid pressure acting against the entire upper surface of the valve closure exceeds the total force of the inlet fluid pressure in conduit 10 acting against the relatively small area on the lower surface of the valve closure exposed thereto, thereby closing the inlet conduit 10 and the outlet conduits 11.

Referring to the valve shown in Fig. 3 it will be noted that no touch button is employed, and that the disc 13' is free to actually reciprocate in the chamber 3'. The vent 4' has a vent conduit 27 extending therefrom to a point remote from the valve and is advantageously opened and closed through the use of a gate valve 28 positioned in the vent conduit 27. This construction is particularly applicable to household faucets and the like. When so employed the vent conduit 27 is ordinarily tied into the drain or it may be tied into the delivery tube 12'.

When the gate valve 28 is opened, the axially slidable closure disc 13' moves upward, allowing fluid to flow from the inlet conduit 10' through the outlet conduits 11' into the delivery tube 12'. Closing the gate valve 28 causes the closure disc 13' to seat on the valve seat 9', thereby cutting off the flow of fluid.

It will be noted that the ring gasket 26 limits the upward stroke of the closure disc 13' and prevents the closure disc 13' from making face-to-face contact with the diaphragm 15.

The valve illustrated in Fig. 4 operates in substantially the same manner as detailed above. As long as the vent 4" is closed the disc 13" remains seated on the disc seat 9". However, when fluid in the flush tank 37 is discharged in the normal flushing procedure, the activator ball 50 is no longer supported by the fluid in the tank 37. As the activator ball 50 and rod 49 move downward, the bonnet 43 is rotated on the nipples 44 and 45, causing the stem bar 48 to tilt the stem 6". The shoulder 7" is thereby tilted off the seat washer 5" opening the vent 4." As the pressure above the closure disc 13" is released, the closure disc 13" moves upward off the seat 9" uncovering the fluid inlet conduit 10" and the outlet conduits 11". Fluid then flows from the inlet conduit 10" through the outlet conduits 11" down the splash tube 38, thereby filling the flush tank.

As the fluid fills the flush tank 37, the activator ball 50 is raised, causing the bonnet 43 to move to its upright position. As the bonnet 43 moves upward, pressure by the stem bar 48 is lessened on the stem 6" until the shoulder 7" is allowed to again seat on the seat washer 5", thereby closing the vent 4".

With the vent 4" thus closed, fluid continues to flow through the valve momentarily. Some of the fluid flows above the valve closure 13" through the aperture 25. As that part of the chamber 3" above the valve closure 13" becomes filled with fluid, the valve closure 13" is forced downward seating on the valve seat 9".

It will be noted that the arrangement of the vent housing 29 and the supply tube 36 make advantageous use of the fluid that flows out the vent 4" when the stem 6" is tilted. Rather than allowing the fluid merely to flow out into the flush tank, the fluid is directed into the overflow conduit (not shown) of the flush tank 37 and is used as a source of fluid supply to the bowl (not shown).

Various modifications may be made in the structures as particularly described above without departure from the scope of the invention. Accordingly, the foregoing description is to be construed as illustrative only and not as a limitation upon the scope of the invention as defined in the following claims.

I claim:

1. A fluid valve assembly comprising a closed casing defining a pressure chamber, said casing having a vent hole therein in communication with one end of said chamber; a valve seat in said casing in communication with the opposite end of said chamber; a valve closure member positioned in said chamber between said seat and said vent; said closure member being normally positioned against said seat but being movable away from said seat; a diaphragm, having a bleed hole therethrough, extending substantially horizontally across said chamber positioned between and in spaced relation with said closure member and said vent to restrict fluid flow therethrough in both directions; said bleed hole being smaller in cross section than said vent; means for limiting the movement of said closure member away from said valve seat; an inlet conduit communicating with said chamber through said valve seat; at least one outlet conduit communicating with said chamber through said valve seat; said closure member engaging said seat to preclude fluid flow from said inlet to said outlet when said closure member is in its position most removed from said vent; means for allowing fluid passage from one side of said closure member to the other side of said closure member, said fluid passage means being smaller in cross section than said bleed hole; and means for opening and closing said vent.

2. A fluid valve assembly comprising a closed casing defining a pressure chamber, said casing having a vent hole therein in communication with one end of said chamber; a valve seat in said casing in communication with the opposite end of said chamber; a valve closure member positioned in said chamber between said seat and said vent; said closure member being normally in sealing engagement with said valve seat but being movable upwardly away from said valve seat; a diaphragm, having a bleed hole therethrough, extending substantially horizontally across said chamber positioned between and in spaced relation with said closure member and said vent to restrict flow therethrough in both directions, said bleed hole being smaller in cross section than said vent; means for limiting the upward movement of said closure member; an annular gasket positioned in said chamber above said diaphragm and below said vent; an inlet conduit communicating with said chamber through said valve seat; at least one outlet conduit communicating with said chamber through said valve seat; said closure member engaging said seat to preclude fluid flow from said inlet to said outlet when said closure member is in its position most removed from said vent; means for allowing fluid passage from one side of said closure member to the other side of said closure member, said fluid passage means being smaller in cross section than said bleed hole; a resilient washer about said vent within said chamber; a stem extending through said vent into said chamber, said stem having a shoulder at its terminus within said chamber effective to seat on said washer and maintain a seal therewith, said stem having a touch button at its terminus without said chamber; and resilient means cooperating with said stem and touch button for normally urging said shoulder upward into contact with said washer.

3. In a valve assembly according to claim 1, said closure member movement limiting means comprising spaced teeth depending from said diaphragm.

4. In a valve assembly according to claim 1, said fluid passage means comprising a channel from said inlet conduit across said valve seat and up the wall of said casing a distance above said closure member.

5. In a valve assembly according to claim 1, said fluid passage means comprising an aperture through said closure member.

6. A fluid valve assembly comprising a closed casing defining a pressure chamber, said casing having a vent therein in communication with one end of said chamber; a valve seat in said casing in communication with the opposite end of said chamber; a valve closure member positioned in said chamber between said seat and said vent; said closure member being movable into and out of sealing engagement with said seat; a diaphragm, having a bleed hole therethrough, extending across said chamber positioned between and in spaced relation with said closure member and said vent, said bleed hole being smaller in cross section than said vent; an annular gasket positioned in said chamber below said diaphragm and above said closure member; an inlet conduit communicating with said chamber through said valve seat; at least one outlet conduit communicating with said chamber through said valve seat; said closure member engaging said seat to preclude fluid flow from said inlet to said outlet when said closure member is in its position most removed from said vent; means for allowing fluid passage from one side of said closure member to the other side of said closure member, said fluid passage means being smaller in cross section than said bleed hole; a vent conduit extending from said vent; and a gate valve positioned in said vent conduit at a point remote from said vent.

7. In a valve assembly according to claim 6, said fluid passage means comprising an aperture through said closure member.

8. A fluid valve assembly comprising a closed casing defining a pressure chamber, said casing having a vent hole therein in communication with one end of said chamber, a valve seat in said casing in communication with the opposite end of said chamber, a valve closure member within said chamber between and in spaced relation with said seat and said vent, said closure member being movable into and out of sealing engagement with said valve seat, an orifice plate having a bleed-hole therethrough extending substantially horizontally across said chamber between said closure member and said vent to restrict fluid flow therethrough in both directions, said bleed-hole being smaller in cross section than said vent, an inlet conduit communicating with said chamber through said valve seat, at least one outlet conduit communicating with said chamber through said valve seat, said closure member engaging said seat to preclude fluid flow from said inlet conduit to said outlet conduit and seal off said chamber from said outlet conduit, a fluid passageway bringing said inlet conduit in open communication with said chamber from one side of said closure member to the other side thereof, said fluid passageway being smaller in cross section than said bleed-hole, the portion on said one side of the closure member exposed to fluid within said inlet conduit being of smaller area than the portion on said other side of the closure member exposed to fluid within said chamber, said closure member being normally held in sealing engagement with said valve seat when the pressure of fluid in said chamber is equal to pressure of fluid in said conduit but being movable out of sealing engagement with said valve seat when pressure in said chamber is released, and means for opening and closing said vent.

9. The fluid valve assembly defined in claim 8 wherein said last named means comprises a stem extending through said vent into said chamber, a radial flange on said stem within said chamber, a seat engageable by said flange within said chamber around said vent hole, resilient means biasing said stem outwardly through said vent hole to maintain said flange in sealing engagement with said seat, a means for transmitting a downward force through said stem to move at least a portion of said flange away from said seat.

References Cited in the file of this patent
UNITED STATES PATENTS

| | | |
|---|---|---|
| 1,657,817 | Cadwell | Jan. 31, 1928 |
| 1,839,144 | Flagg | Dec. 29, 1931 |
| 2,000,002 | Stockmeyer | Apr. 30, 1935 |
| 2,039,109 | Pasman | Apr. 28, 1936 |
| 2,283,973 | Criss | May 26, 1942 |
| 2,636,517 | Ferguson | Apr. 28, 1953 |
| 2,691,504 | Jones | Oct. 12, 1954 |